(12) United States Patent
Kang et al.

(10) Patent No.: US 6,754,770 B2
(45) Date of Patent: Jun. 22, 2004

(54) COHERENCE PRESERVATION METHOD OF DUPLICATED DATA IN RAID SUBSYSTEM

(75) Inventors: Dong Jae Kang, Taejon (KR); Bum Joo Shin, Taejon (KR); Chang Soo Kim, Taejon (KR); Young Ho Kim, Taejon (KR); Yu Hyeon Bak, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 224 days.

(21) Appl. No.: 10/175,099

(22) Filed: Jun. 20, 2002

(65) Prior Publication Data

US 2003/0177309 A1 Sep. 18, 2003

(30) Foreign Application Priority Data

Mar. 14, 2002 (KR) ........................................ 2002-13801

(51) Int. Cl.[7] .............................................. G06F 12/00
(52) U.S. Cl. ........................................... 711/114; 714/6
(58) Field of Search .................. 711/114; 365/200–201; 714/1–6, 753–758, 761–773

(56) References Cited

U.S. PATENT DOCUMENTS 6,058,054 A    5/2000  Islam et al.

FOREIGN PATENT DOCUMENTS

| JP | 11-85410 | 3/1999 | ............ G06F/3/06 |
| KR | 2001-11204 | 2/2001 | ........... G06F/11/00 |

OTHER PUBLICATIONS

Edward K. Lee and Chandramohan A. Thekkath; Petal: *Distributed Virtual Disks;* Systems Research Center, Digital Equipment Corporation; 7th International Conference on Architectural Support for Programming Languages and Operating Systems; 1996; pp. 1–9.

*Primary Examiner*—Nasser Moazzami
(74) *Attorney, Agent, or Firm*—Jacobson Holman PLLC

(57) ABSTRACT

Disclosed is a coherence preservation method of duplicated data in RAID subsystem. The method comprises the steps of: if a read operation is requested by the RAID subsystem, selecting an arbitrary target disk among disks having duplicated data, and implementing the read operation on the selected disk; implementing a read error handling to determine whether an error occurs in the disks selected upon the read operation, and if the error occurs in the read operation of the selected target disk, repeating the read error handling until the read operation of the data succeeds by circulating the remaining metering-treated disks in turns; after the read error handling, if the read operation on the remaining disk in all succeeds, completing the read error handling, and if the read operation on the remaining disk in all fails, returning the error to the disk, and completing the read error handling; if a write operation is requested by the RAID subsystem, implementing the write operation on the disks having duplicated data; after implementing the write operation, if a temporary error occurs in the duplicated data, implementing a temporary error handling to maintain the data coherence in the disks having the duplicated data and to recover the temporary error; and after implementing the write operation, if a permanent error occurs in the duplicated data, implementing a permanent error handling to maintain the data coherence in the disks having the duplicated data and to recover the permanent error.

5 Claims, 4 Drawing Sheets

COHERENCE PRESERVATION METHOD OF DUPLICATED DATA IN RAID SUBSYSTEM

BACKGROUND OF THE INVENTION

1. Field of the Invention

The present invention relates to a RAID subsystem, and more particularly, to a coherence preservation method of duplicated data in RAID subsystem.

2. Background of the Related Art

Generally, RAID (redundant array of inexpensive disks) subsystems provide storage management with the effectiveness by recognizing several physical devices as one logical device, and support a characteristic of high availability allowing high performance data input/output and failure in accordance with RAID levels (RAID0 to RAID9).

The RAID subsystem supports several levels of RAID, duplicating and storing the data at a disk array consisting of a number of disk drives, and implements the input/output in parallel. In addition, the subsystem requires a method capable of supporting the availability of the data without not interrupting the service of the system when the error occurs in each RAID level, and rapidly recovering an error data.

For example, RAID1 of a disk mirroring type corresponding to a level 1 of the RAID is any one level of RAID in that the same data is duplicated and stored in different several number of disks to improve the availability and reliability of the data, and the load balancing is implemented from the duplicated data of several disk with respect to the write operation. Temporary and permanent errors generated in the existing RAID subsystem supporting the RIAD1 cause a problem of coherence in the duplicated data.

In particular, the temporary error is generated when access to the disk is not allowed temporally due to several situations, thereby resulting in a problem of data coherence or inconsistency among the disks. The permanent error is generated from a physical failure of the disk, so that it is inevitable to replace the disk and to recover the entire data of the disk in which the error occurs.

Accordingly, the conventional RAID subsystem supporting the RAID1 has to consider a method of preventing the data failure due to the error and of managing the coherence among the duplicated data to maintain the data properly. In order to solve the problem, it has been a method of preventing the data failure from the error by comparing the contents stored in the respective cache to coincide with each other by use of two RAID controllers, thereby securing the correction of the data, and implementing the write on the disk from the cache of the controller used when the error occurs.

Proposed is another method for maintaining the coherence among the duplicated data of the RAID1 in which busy/stale bit used in Petal of virtual disk system is adopted.

According to a method for maintaining the data coherence in the Petal, if the write operation on the data is requested, a busy bit is set to "1" before the operation. If the write operation on the entire disks consisting the RAID1 is normally completed, a busy nit is set to "0" . If an error occurs in an arbitrary disk, a stale bit is set to "1" with respect to a data block to be used from now on. The set stale bit is used upon implementing the temporary error recovery of the disk, and selection recovery is performed with respect to the data blocks with "1" of the stale bit.

The Petal method needs the operation expense with respect to the bit every operation, and requires a separate stable disk for the busy/stale bit.

In addition, in order to maintain the data coherence and secure the correction of the data, a method of reading the contents of the respective disk and comparing the contents fo the duplicated data is simple, it provides a drawback of increasing load of the system.

SUMMARY OF THE INVENTION

Accordingly, the present invention is directed to a coherence preservation method of duplicated data in RAID subsystem that substantially obviates one or more problems due to limitations and disadvantages of the related art.

An object of the present invention is to a coherence preservation method of duplicated data in RAID subsystem, in which when an error occurs in disks of the RAID subsystem supporting RAID1 of disk mirroring type, a bitmap managing the information of data coherence (called as FBB (failed block bitmap)) is added, so that it secures the coherence of the duplicated data and supports rapid recovery of the data having improper coherence from a temporary or permanent error, and which when recovering the data due to the permanent error of an arbitrary disk, it is possible to disperse the load on a write operation, and to decrease the recovery expense.

To achieve the object and other advantages, according to one aspect of the present invention, there is provided a coherence preservation method of duplicated data in RAID subsystem, the method comprising the steps of: if a read operation is requested by the RAID subsystem, selecting an arbitrary target disk among disks having duplicated data, and implementing the read operation on the selected disk; implementing a read error handling to determine whether an error occurs in the disks selected upon the read operation, and if the error occurs in the read operation of the selected target disk, repeating the read error handling until the read operation of the data succeeds by circulating the remaining metering-treated disks in turns; after the read error handling, if the read operation on the remaining disk in all succeeds, completing the read error handling, and if the read operation on the remaining disk in all fails, returning the error to the disk, and completing the read error handling; if a write operation is requested by the RAID subsystem, implementing the write operation on the disks having duplicated data; after implementing the write operation, if a temporary error occurs in the duplicated data, implementing a temporary error handling to maintain the data coherence in the disks having the duplicated data and to recover the temporary error; and after implementing the write operation, if a permanent error occurs in the duplicated data, implementing a permanent error handling to maintain the data coherence in the disks having the duplicated data and to recover the permanent error.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

A coherence preservation method of duplicated data in RAID (redundant array of inexpensive disks) subsystem according to one preferred embodiment of the present invention will now be explained with reference to the accompanying drawings.

The coherence preservation method according to the present invention provides a scheme for preserving the coherence between the duplicated data of the RAID, and a write operation for effectively processing an input/output request which is generated upon restoring the disk data, when an error occurs in the RAID subsystem supporting RAID1.

The RAID1 is any one level of RAID in that since a mirror disk unit has a redundancy it provides availability of data and recovers the data when an error occurs in a disk unit. Accordingly, if a temporary error occurs, the data each stored in primary and copy disks has to have coherence preservation. In addition, if a permanent error occurs, a policy is protected for effectively recover the data.

Figure 1:
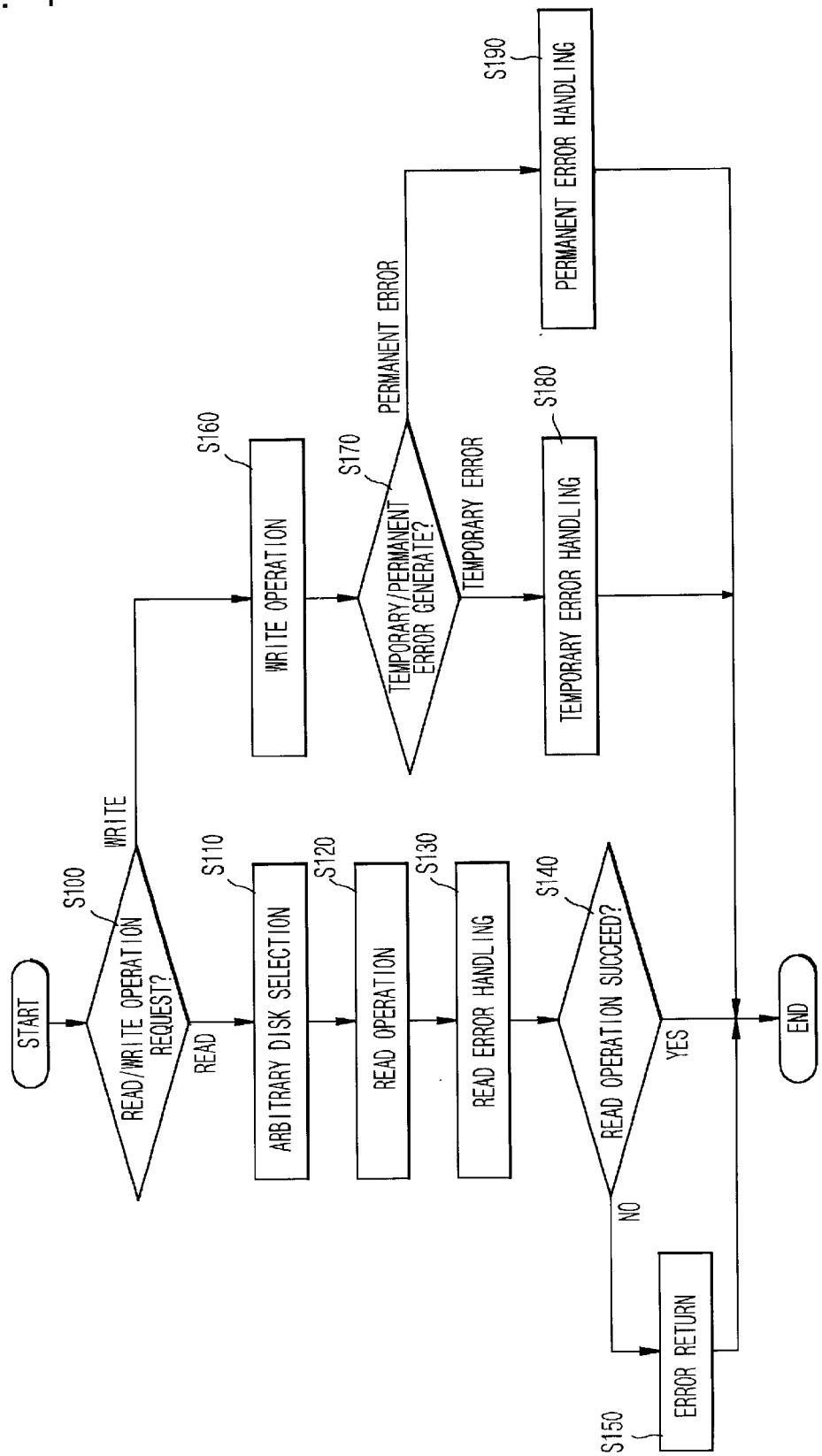
FIG. 1 is a flow chart of a coherence conservation method of a duplicated data in the raid subsystem according to one preferred embodiment of the present invention.

As shown in FIG. 1, if a read operation is requested by the RAID subsystem according to the present invention (step S100), after an arbitrary target disk is firstly selected through a round-robin fashion and a random disk selection fashion (step S110), the read operation on the selected disk is executed (step S120).

The reason that the arbitrary target disk is firstly selected is that it prevents an input/output demand from being concentrated upon one disk in an environment in which the disks are shared. As the results, a performance of the read operation of the RAID1 may be improved.

After the arbitrary target disk is selected and then the read operation is executed, a read error handling is executed whether an error occurs between the disks selected upon the read operation. If an error occurs in the read operation of the selected target disk, read error handling is repeated until the read operation of the data succeeds by circulating the remaining metering-treated disks in turns (step S130).

If the read operation on the remaining disk in all succeeds, the read error handling is completed (step S140). If the read operation on the remaining disk in all meets with failure, the error is returned to the disk, and then the read error handling is completed (step S150).

Meanwhile, if a write operation is requested by the RAID subsystem according to the present invention (step S100), the write operation on the disks having duplicated data is executed (step S160).

After executing the write operation, if a temporary error occurs in the duplicated data (step S170), temporary error handling is executed to maintain the data coherence in the disks having the duplicated data and to recover the temporary error (step S180). If a permanent error occurs in the duplicated data to demand the replacement of the physically damaged disk (step S170), the coherence is maintained between corresponding disks by implementing the permanent error handling, and the permanent error of the disk is recovered (step S190).

A method of maintaining the data coherence among the disks having the duplicated data in the LAID1 by implementing the temporary error handling to recover the temporary error (step S180), and a method of maintaining the data coherence by implementing the permanent error handling to recover the permanent error of the disk (step S190) will now be described.

Figure 2:
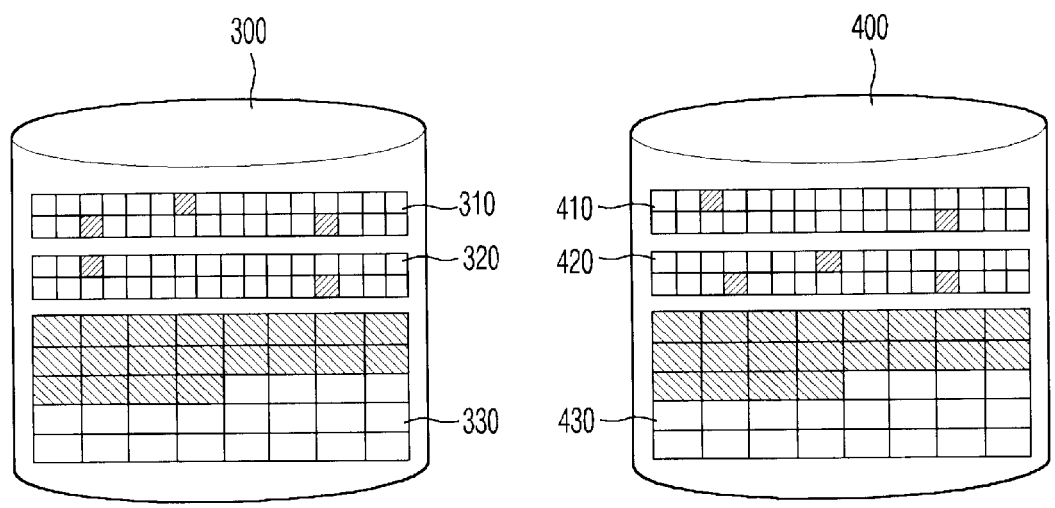
FIG. 2 is a view illustrating the structure of a disk for temporary error handling.

Referring to FIG. 2, there are some cases of: implementing the write operation on the disks 300 and 400 consisting LAID1; of achieving the write on the primary disk 300 but failing the write on the copy disk 400 due to several causes; or of achieving the write on the copy disk 400 but failing the write on the primary disk 300. These cases are corresponding to the improper data coherence among the duplicated data in the RAID1.

The situation that the data coherence is improper is a case of proceeding the write on a portion of the disk only at the typical input/output operation.

Meanwhile, in case of failing the write on both of the primary and copy disks 300 and 400 due to the impossible access to the entire system resulted from the error of the system or the error of the network, the disk write does not happen because of the error of the entire system, thereby no producing a problem in the data coherence.

In order to maintain the data coherence in the RAID 1 and to recover the data of improper coherence, the RAID subsystem according to the present invention maintains bitmap FBBs 310, 410, 320 and 420 for managing the data coherence in the respective disk 300 and 400 consisting the LAID1, as shown in FIG. 2.

The FBB is existed in the respective disk to maintain the information of the disk data coherence, manages one bit every input/output unit, and records the coherence information of the corresponding data block.

In case of occurring the error in the arbitrary disk, the FBBs 310, 410, 320 and 420 duplicate and store the information on the disks of the primary disk 300 and copy disk 400 to recover and maintain the data coherence through the information of the bitmap, and is set as "0" at early stage. In addition, in only case that I/O error occurs during implementing the operation, corresponding FBBs duplicated on the respective disk related to the target disk to be operated are indicated in improperness of the coherence, to indicate whether the data maintains the coherence at present.

Specifically, as shown in FIG. 2, in case that the write is impossible upon requesting the write operation on the primary disk 300, the coherence information is indicated in the bit of corresponding block at FBBs 310 and 410 of the primary disk stored in the primary and copy disks 300 and 400. If an error occurs upon implementing the write operation in the primary disk 300 or the copy disk 400, it accesses to the FBB of the corresponding FBB. At that time, since the FBB exists in both of primary and copy disks, if the error occurs in the entire disk, if is possible to access to the FBB of the corresponding disk existed in the normal disk consisting the RAID1.

For example, if an error not accessing to the entire of the copy disk 400 occurs, the bit of FBBs 320 and 420 in charge of the corresponding data block of the copy disk 400 is indicated in the improperness of the coherence. However, since FBBs 320 and 420 regarding the copy disk 400 is duplicated on the primary disk 300, FBB 320 of the copy disk 400 existed in the primary disk 300 is indicated in the improperness of the coherence of the corresponding block.

The state of the write error on the data is classified into two cases, i.e., a case that the access to the block subject to the operation is impossible, and a case that the access to the entire of the corresponding disks is impossible. The former is a state that the access to the corresponding FBBs 310, 410, 320 and 420 of the respective disk is possible, so that a problem occurs at the data coherence of the target block. The latter is a state that the access to all of FBBs 310, 410, 320 and 420 existed in the block subject to operation and the corresponding disk, thereby resulting in that the information of the FBB existed in the target data and the target disk has improper coherence.

The problem of the data coherence may occur between the duplicated FBBs and the data block, and has to be considered when recovering the temporary error and the permanent error. The coherence information of the respective duplicated FBB disagrees with each other. The information of all of duplicated FBBs is used to obtain the proper coherence information. That is the reason at least one of the duplicated FBBs maintains proper information when the error occurs to cause the inconsistency of the data.

In order to recover the inconsistency of the data, if bit OR operation is implemented among the coherence information of the duplicated FBB, it can search the data in which the inconsistency occurs whenever the coherence is not maintained among the FBBs. Accordingly, upon recovering the temporary error on the temporary disk, the bit OR operation is implemented in the information of the corresponding FBB existed in the respective disk, to obtain a correct result on all cases in which the temporary access is impossible.

The recovery on the temporary error is implemented by detecting the blocks which are indicated in the improperness of the coherence in a value of the FBB, the value being resulted from the bit OR operation, and reading and altering the corresponding data block from the arbitrary normal disk block consisting the RAID1.

Figure 3:
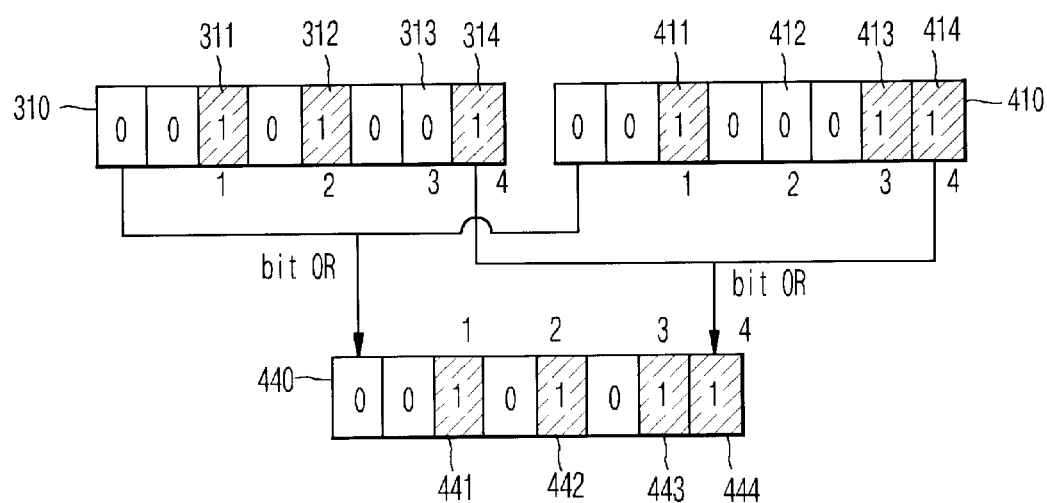
FIG. 3 is a view illustrating FBB for recovering an error which is calculated by bit OR operation.

For example, in FIG. 3 showing an error recovering FBB 440 calculated by implementing the bit OR operation, the FBBs 310 and 410 are FBB corresponding to the primary disk 300, and are duplicated on the primary disk 300 and the copy disk 400. Reference numerals 311, 411, 314 and 414 denote bits of the FBB normally indicated in the improperness of the coherence in the write error, and reference numerals 312, 412, 313 and 413 denote bits of the FBB indicated in a portion of the improperness of the coherence in the write error.

Portions indicated in "1" (denoted by reference numerals 311 and 411) and "4" (denoted by reference numerals 310 and 410) are a case that the write operation is failed due to the temporary error, and a case that the FBBs 310 and 410 are updated. Portions indicated in "2" (denoted by reference numerals 312 and 412) and "3" (denoted by reference numerals 313 and 413) are the result in that the update of the FBBs 310 and 410 succeeds in the disks 300 and 400 by the occurrence of the temporary error no capable of accessing the entire of the disk with respect to one disk between the primary or copy disk 300 or 400.

Accordingly, blocks 441, 442, 443 and 444 indicated in the improperness of coherence may be searched from a temporary error recovering FBB 440 which is a resulted value obtained by bit OR-operating the FBBs 310 and 410 having the coherence information of the corresponding disk with respect to the disk to be required the recovery of the temporary error.

A method for maintaining the coherence among the duplicated data proposed by the present invention may adopt the write operation of the normal mode while maintaining the existing performance because of no affecting on the input/output performance of the RAID1, and maintain accurately the coherence information on the possible error to secure the reliability of the data of the RAID1.

When the permanent error occurs in the disk of the RAID1, the write operation for effectively servicing the input/output request generated upon implementing the recovery will now be described.

The permanent error handling is implemented by coping the disk data from the normal disks having the duplicated data, and, in order to secure the availability of the data, the input/output service is not interrupted during the recovery operation of the disk.

When the permanent error occurs in the disk, it is required an effective method for avoiding sudden reduction of the performance. The permanent error handling method according to the present invention proposes the write operation capable of decreasing the load balancing and recovery expense on the read operation which is generated when recovering the disk.

According to the existing system, the service for the write operation generated when recovering the disk is implemented from the normal disk. In case of write operation, only the service is allowed for the normal disk and recovered region. However, according to the operation of the present invention, the write is allowed for the recovered region and not-recovered region, contrary to the existing system of processing the input/output need during implementing the disk recovery.

Figure 4:
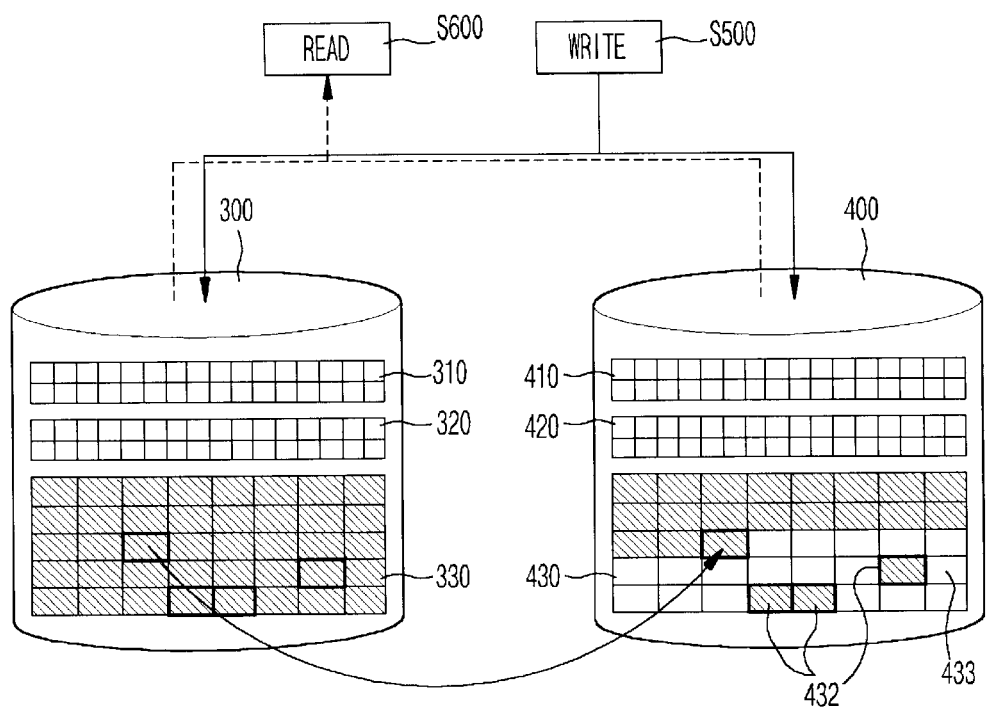
FIG. 4 is a view illustrating the structure of a disk for permanent error handling.

Referring to FIG. 4, the FBBs 310, 410, 320 and 420 are used to manage the information related to the recovery of the blocks of disk replaced during the recovery of the disk is processed. Contrary to the case of the temporary error, since the data coherence of the normal disks is an improper state, the FBB of the disk to be recovered is initialized as "1". Since the data coherence is a proper state, the recovered disk region is set to "0".

As shown in FIG. 4, A recovery completed region 431 refers to a region where the update of the data has been completed from the normal disk, while a non-recovery region 433 refers to a region where the recovery of the data fails. In addition, a region 432 where the write is completed on the non-recovery region refers to a region where the data is recorded according to a request of the input/output service generated during the recovery operation.

During the recovery of the disk is proceeded, a case of requesting the write operation (step S500) may be classified into two cases, in other words, a case that a block to be operated is existed in the recovery region 431, and a case that the block to be operated is existed in the non-recovery region 433.

If the write operation is requested during the disk recovery (step S500), the write on the recovery region 431 and the non-recovery region 433 is allowed (step S510). If the target region is the recovery region 431 (step S520), the write operation on the normal disks and the replaced disks is implemented and completed, identical to the operation at a normal mode (step S640).

Meanwhile, if the target block of the write operation is the non-recovery region 433 (step S520), the write operation is implemented on the normal disk and a new disk, and then the operation is completed by determining whether the recovery on the duplicated FBB having the coherence information of the corresponding disk data is completed (step S530). The above process provides an advantage in that the disk recovery expense is decreased by reducing the region to be recovered in the replaced disk.

Figure 5:
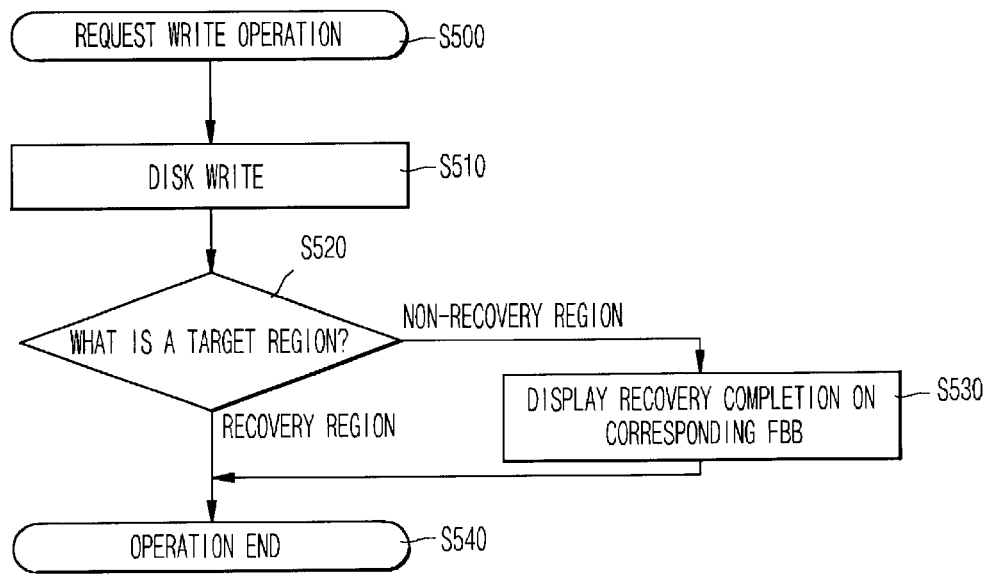
FIG. 5 is a flow chart of a method of a write operation generated upon the permanent error recovery.
Figure 6:
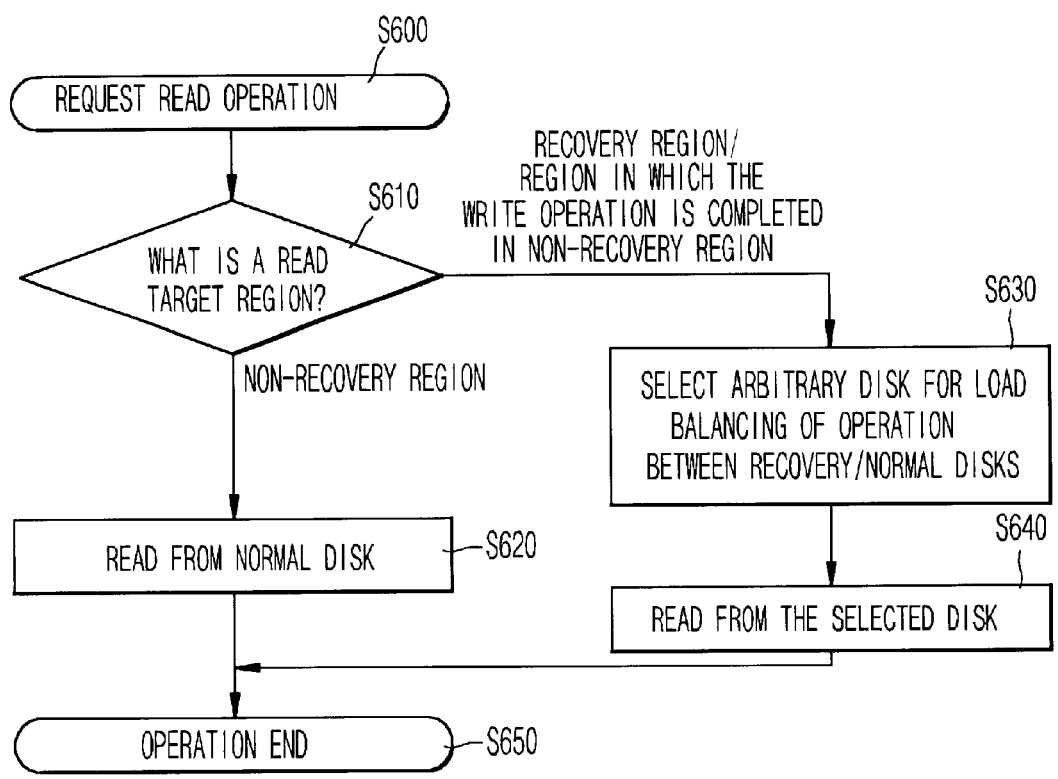
FIG. 6 is a flow chart of a method of a read operation generated upon the permanent error recovery.

As shown in FIG. 5, if the read operation is requested during the recovery of the disk (step S600), it is classified into three cases, in other words, a case that the target block is the recovery region 431, a case that the target block is the non-recovery region 433, and a case that the target block is a region 432 in which the write is completed, according to the target block of the read operation by reference with the corresponding FBB information before the operation implement (step S610).

In case the target block is the recovery region 431, the data is read from the normal disk (step S520), and then the operation is completed (step S550). In cases the target block is the non-recovery region 433 or the target block is a region 432 in which the write is completed, after the target disk is selected by the round-robin fashion or the arbitrary disk selection fashion for load balancing of the write operation, similar to the normal mode (step S630), the write operation is implemented from the selected disk (step S640), and then the operation is completed (step S650).

The permanent error recovery method of the RAID1 proposed by the present invention allows the write on the recovery and non-recovery regions, so that with respect to the operation request generated upon recovering the disk data the load expensive of the system is decreased, and the sudden reduction of the performance of the system when recovering the error is relieved. In other words, the FBB is reused to manage the recovery information on the replaced disk, and contrary to the existing system on the write operation generated when implementing the recovery of the disk, the write on the non-recovery region is allowed, thereby enlarging the region of the disk capable of dispersing the load in the write operation, and reducing the recovery expense of the replaced disk.

With the coherence preservation method according to the present invention, when an error occurs in disks of the RAID subsystem supporting RAID1 of disk mirroring type, a bitmap managing the information of data coherence (called as FBB (failed block bitmap)) is added, so that it secures the coherence of the duplicated data and supports rapid recovery of the data having improper coherence from a temporary or permanent error. In addition, when recovering the data due to the permanent error of an arbitrary disk, it is possible to disperse the load on a write operation, and to decrease the recovery expense.

In particular, when recovering the data having improper data coherence, the bit OR operation is implemented between the FBBs, so that it can obtain the correct coherence information with respect to all of cases. When recovering the data due to the permanent error of the arbitrary disk, the load balancing on the read operation is possible, and the recovery expense is decreased The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A coherence preservation method of duplicated data in RAID subsystem, the method comprising the steps of:
   if a read operation is requested by the RAID subsystem, selecting an arbitrary target disk among disks having duplicated data, and implementing the read operation on the selected disk;
   implementing a read error handling to determine whether an error occurs in the disks selected upon the read operation, and if the error occurs in the read operation of the selected target disk, repeating the read error handling until the read operation of the data succeeds by circulating the remaining metering-treated disks in turns;
   after the read error handling, if the read operation on the remaining disk in all succeeds, completing the read error handling, and if the read operation on the remaining disk in all fails, returning the error to the disk, and completing the read error handling;
   if a write operation is requested by the RAID subsystem, implementing the write operation on the disks having duplicated data;
   after implementing the write operation, if a temporary error occurs in the duplicated data, implementing a temporary error handling to maintain the data coherence in the disks having the duplicated data and to recover the temporary error; and
   after implementing the write operation, if a permanent error occurs in the duplicated data, implementing a permanent error handling to maintain the data coherence in the disks having the duplicated data and to recover the permanent error.

2. The coherence preservation method as claimed in claim 1, wherein the steps of implementing the temporary error handling and the permanent error handling comprises the steps of:
   duplicatly storing a bitmap (FBB) for managing an information of the data coherence every disk consisting a RAID1;
   recoding the information of the coherence on the accessable duplicated bitmap (FBB) related to the target data of the operation if an error occurs when operating the respective disk;
   implementing a bit OR operation by use of the information of the coherence recorded on the respective bit of the bitmap when recovering the data of improper coherence; and
   reading the data from a normal disk by use of an error recovery bitmap (FBB) extracted by the bit OR operation.

3. The coherence preservation method as claimed in claim 2, wherein in the step of implementing the permanent error handling, with respect to an input/output request generated during recovering the permanent error on the respective error consisting the RAID1, the write operation on a recovery region and non-recovery region of the disk is allowed.

4. The coherence preservation method as claimed in claim 2, wherein in the step of implementing the permanent error handling, when recovering the permanent error with respect to each disk consisting the RAID1, the recovering region of disk is classified into a recovery region, a non-recovery region, and a region in which the write is completed, the information of the coherence is set to the bitmap (FBB), and the input/output is implemented according to the classified regions.

5. The coherence preservation method as claimed in claim 2, wherein in the step of implementing the permanent error handling, to maintain the information of the coherence of a normal disk with respect to a disk replaced when recovering the data of the disk, a recovery information is maintained by reusing a used bitmap (FBB).

* * * * *